United States Patent [19]

Scott

[11] 4,141,567
[45] Feb. 27, 1979

[54] HANDLE BAR HAND GUARDS

[76] Inventor: Gary M. Scott, 17385 Colina Vista, Milwaukie, Oreg. 97222

[21] Appl. No.: 764,191

[22] Filed: Jan. 31, 1977

[51] Int. Cl.² ............................................. B62J 23/00
[52] U.S. Cl. ............................. 280/289 G; D12/114; 74/551.8; 74/551.9; 296/78.1
[58] Field of Search ........... 280/289 H, 289 G, 289 S; 296/78.1; 74/551.8, 551.9; D12/114, 178; 180/82 R

[56] References Cited

U.S. PATENT DOCUMENTS

D. 176,579  1/1956  Kraver ............................. 280/289 G
3,832,912   9/1974  Edwards ........................... 74/551.8

FOREIGN PATENT DOCUMENTS 539691   7/1955  Belgium ................................... 280/289
909539   3/1954  Fed. Rep. of Germany .......... 74/551.8
151395  10/1955  Sweden ................................... 296/78.1

Primary Examiner—Joseph F. Peters, Jr.
Assistant Examiner—Donn McGiehan

[57] ABSTRACT

Rigid protective coverings for the hands when operating a handle bar controlled vehicle that are attached securely to the vehicle and allow convenient access for the operator.

6 Claims, 15 Drawing Figures

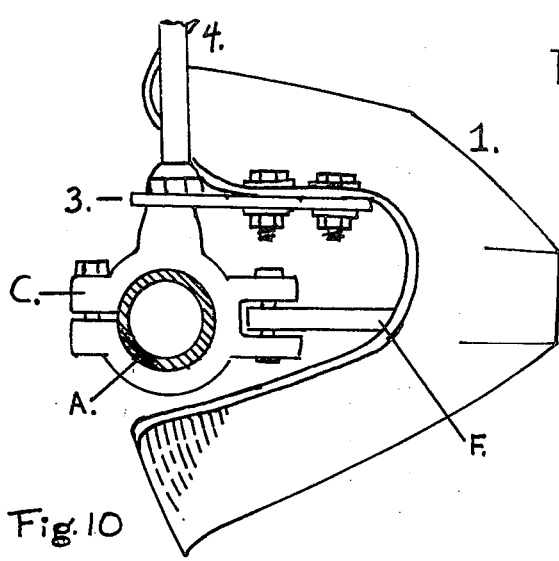
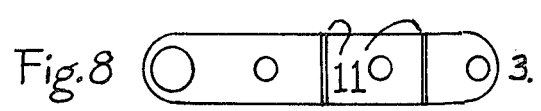
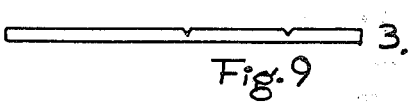
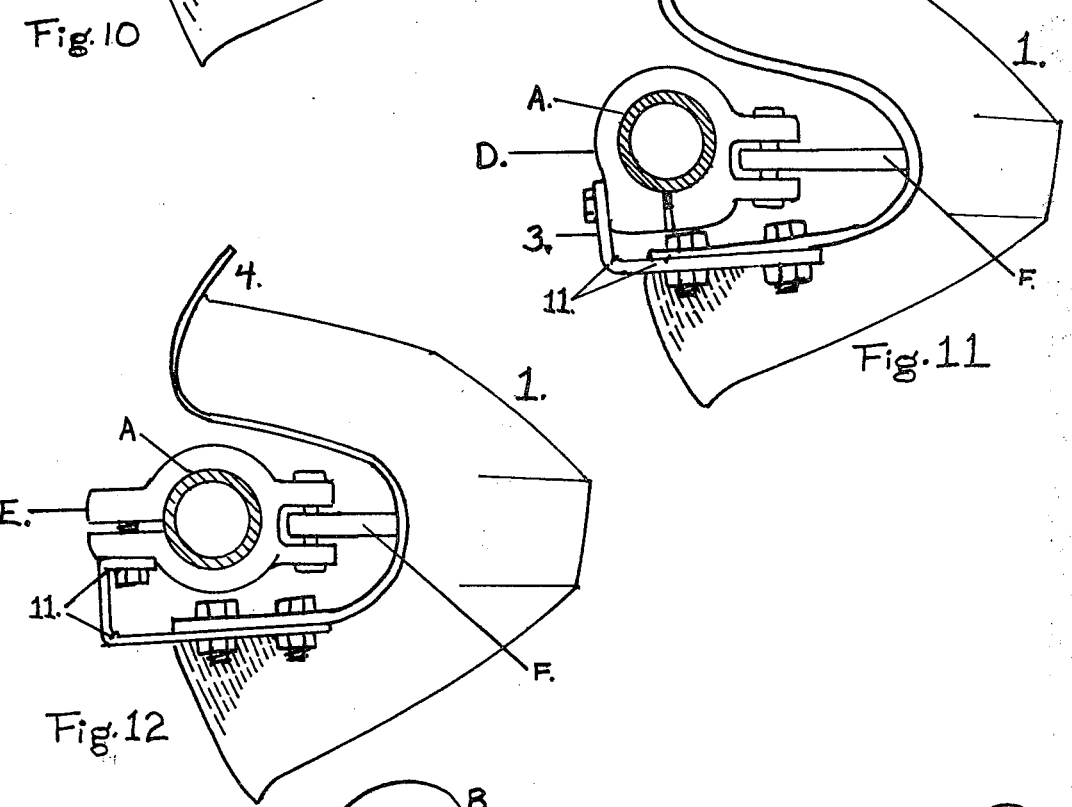
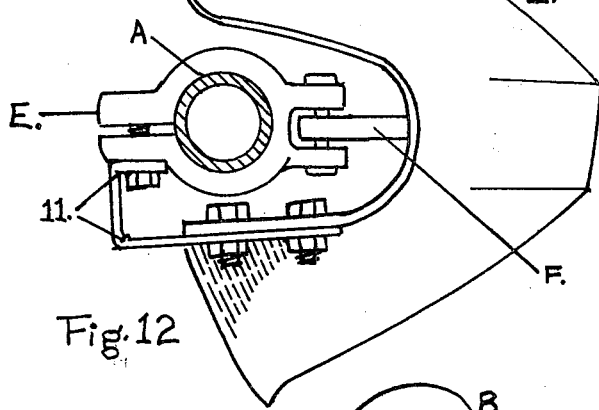
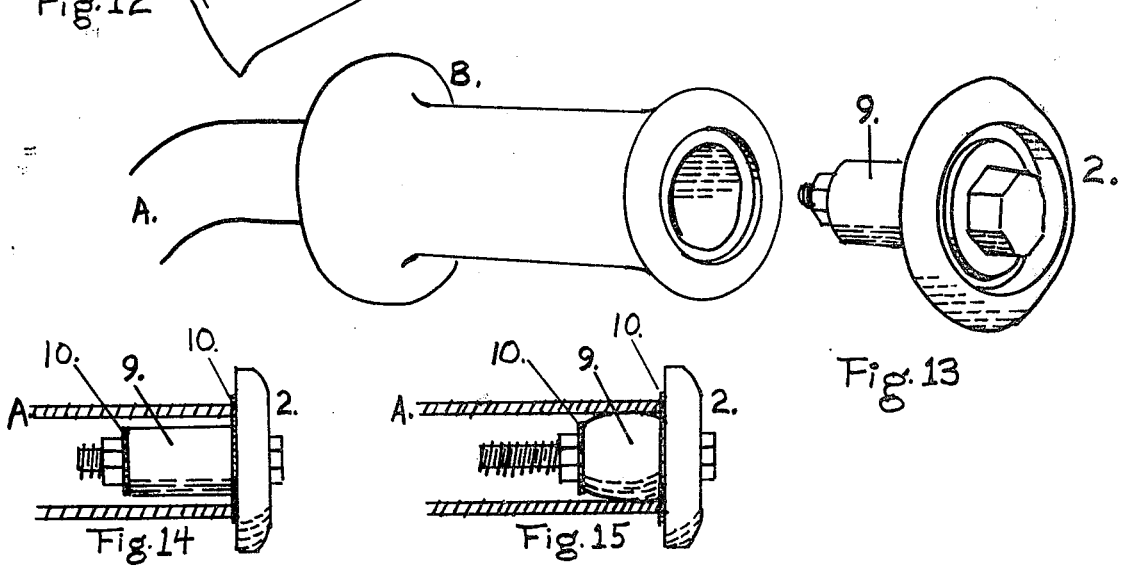
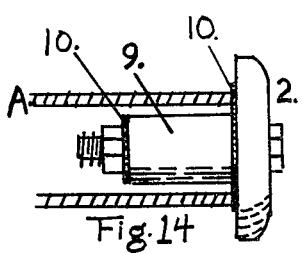
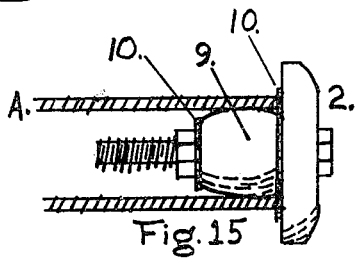

HANDLE BAR HAND GUARDS

SUMMARY OF THE INVENTION

On handle bar controlled vehicles, the hands are located at the outside extremes of the vehicle, exposing them to the elements and making them most vulnerable to potential hazards.

Hand guards are a rigid cover that fits directly in front and approximately 180° around a motorcycle, snowmobile, bicycle or other handle bar controlled vehicle operator's hands.

The close proximity of the hand guards to the hands significantly reduce wind chill and give considerable protection from rain, thrown rocks, insects, and other hazards.

The hand guard is securely attached with a metal bracket inboard of the hand grip that attaches directly to the lever clamp and an expanding plug assembly that attaches the outside of the hand guard directly into the end of the handle bar.

If the rider desires to remove the hand guard, the expanding plug assembly can be used to cover the open end of the handle bar.

The metal mounting bracket used for inside attachment is designed to adapt to a variety of lever clamps.

The plastic hand guard body has strengthening ribs directly over the finger area. The top edge of the hand guard curves forward, away from the rider to reduce the chance of injury and to deflect water that might collect on top of the hand guard around to the extreme outside edge where it has less chance of reaching the rider.

There are two relieved areas in the right side hand guard body to allow for the passage of either top routed or bottom routed throttle cables.

The hand guard gives additional comfort and protection to motorcycles, snowmobiles, bicycles, and other handle bar controlled vehicles.

BRIEF DESCRIPTION OF THE DRAWING

FIG. 8 is the top view of the metal bracket that attaches the inside of the hand guard directly to the handle bar lever clamp;

FIG. 9 is the side view of the metal bracket;

FIG. 10 is the metal bracket used with a lever clamp that has a mirror mounting boss;

FIG. 11 is the metal bracket bent into an "L" shape at the first indent and attached to a lever clamp with a rear pinch bolt;

FIG. 12 is the metal bracket bent 90° at both indents into a "J" shape and attached to a lever clamp with a bottom mounted pinch bolt;

FIG. 13 is the end cap ready to be inserted into the end of the handle bar;

FIG. 14 is the expanding rubber fastener inserted in the end of the handle bar; and FIG. 15 shows the rubber fastener when it is tightened.

1. is the plastic hand guard body;
2. is the plastic end cap;
3. is the metal inside mounting bracket;
4. is the splash deflecting lip;
5. is the reinforcing rib;
6. is the indent for the routed throttle cable;
7. is the relief for a bottom routed throttle cable;
8. is the contoured section for mirror and hydraulic brake cylinder clearance;
9. is the expanding rubber fastener;
10. is the toothed washer that counteracts rotation of the expanding rubber fastener;
11. is the indented bending guide;
A. is a handle bar;
B. is a hand grip;
C. is a lever clamp with a mirror mount;
D. is a lever clamp with a rear pinch bolt;
E. is a lever clamp with a bottom pinch bolt;
F. is a control lever;
G. is a riders hand; and
H. is a control lever cable and adjuster.

DETAIL DESCRIPTION OF THE INVENTION

Figure 1:
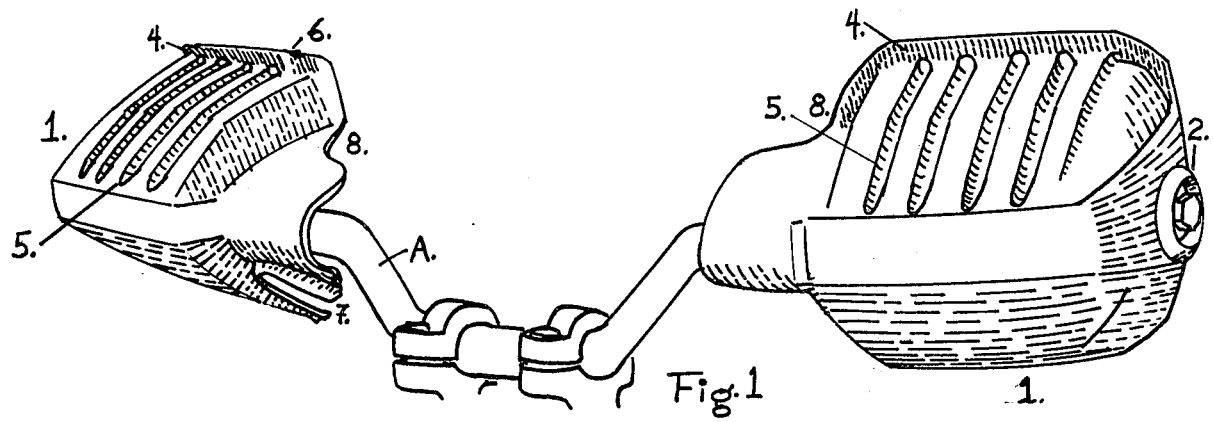
FIG. 1 is a perspective view of a pair of hand guards mounted on a handle bar.
Figure 2:
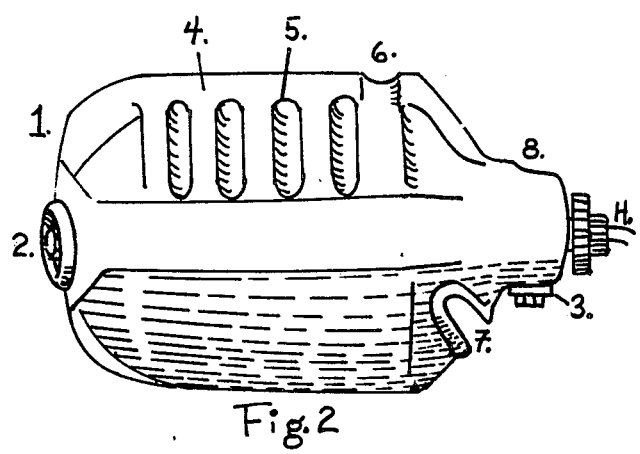
FIG. 2 is the front view of the right hand guard.

FIG. 1 of the drawing shows a pair of hand guards as mounted on conventional handle bars. The right and left hand guard are mirror images of each other with the exception that the right side hand guard has an indented area (6) to allow for the smooth access of a throttle cable that is routed vertically up from the throttle and a cut away section (7) to allow for the exit of bottom routed throttle cables.

Figure 3:
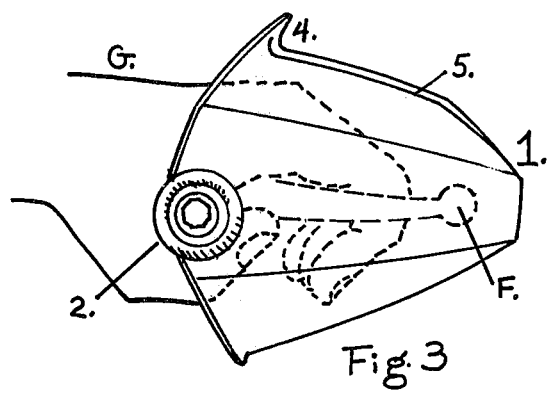
FIG. 3 is the outside end view of the hand guard showing the position of the hand when grasping the handle bars and operating a control lever.

In FIG. 3 it can be seen how the shape of the hand guard closely follows the contour of the hand for maximum frontal coverage yet has considerable access from the rear for maximum control.

Figure 4:
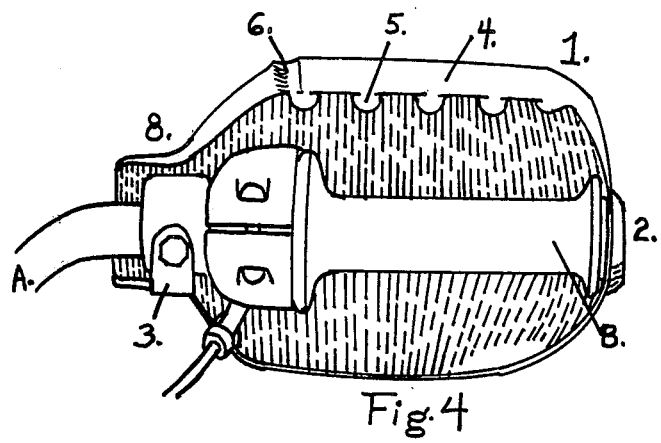
FIG. 4 is the right side hand guard as viewed directly from the rear.
Figure 5:
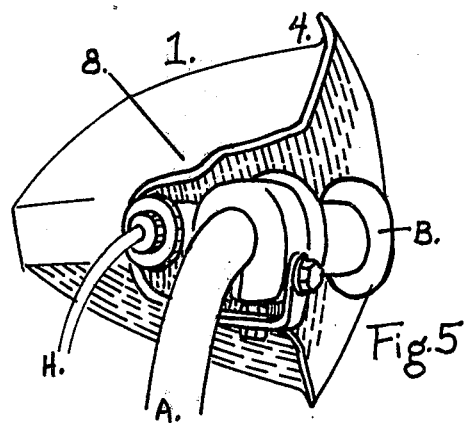
FIG. 5 is the right side hand guard as viewed from the inside end.
Figure 6:
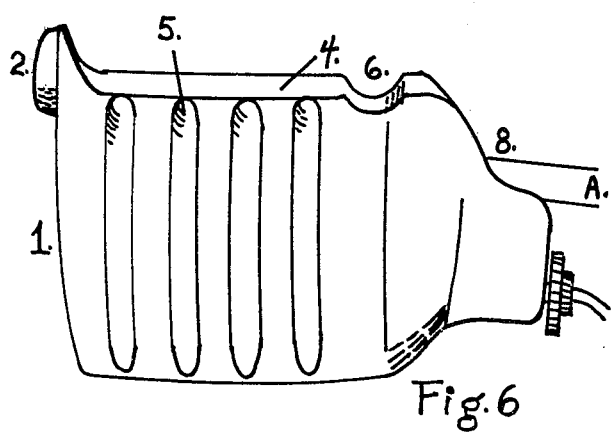
FIG. 6 is the right side hand guard as viewed from the top.
Figure 7:
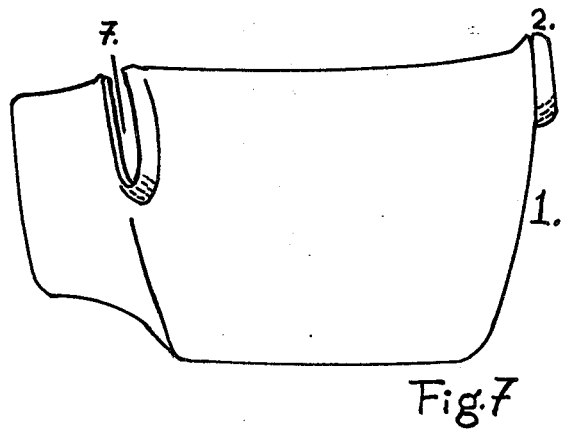
FIG. 7 is the right side hand guard as viewed from the bottom.

The top lip of the hand guard (4) is angled away from the rider to deflect water around to the outside edge. This lip is also a safety feature because of its broad contact area as shown in FIG. 4.

The top surface of the hand guard features concave ribs (5) for additional strength directly over the finger area.

The section furtherest inboard on each hand guard (8) is formed to clear handle bar mounted mirrors, hydraulic cylinders and other handle bar mounted hardware. This portion of the hand guard is of reduced sectional area to closely conform to the inboard portion of the handle bar so as to restrict the passage of air as much as possible.

The inside mounting bracket (3) solidly attaches the hand guards inboard of the hand grips by attaching directly to the lever clamps. Pre-drilled holes and bending indentations (11) allow the inside mounting bracket (3) to be easily adapted to any of the three standard configurations of lever clamps.

In FIG. 10 the inside mounting bracket is shown fastening a hand guard directly to a mirror mounting bolt. In FIG. 11 the inside mounting bracket adapts to a rear mounted pinch bolt type lever clamp by bending 90° at the first indentation. FIG. 12 shows that by putting 90° bends in the bracket at each bending indentation that the bracket adapts to a bottom pinch bolt type lever clamp.

The fastening device to the outside of the handle bar is an end cap (2) combined with an expanding rubber plug (9). This fastener not only secures the hand guard in place, but can also be used to cover the open end of the handle bar if it is desired to remove the hand guards temporarily as shown in FIG. 13. In either case the expanding plug is inserted into the end of the handle bar as shown in FIG. 14, then the bolt is tightened expanding the rubber plug (9) securing the device in the end of the handle bar as shown in FIG. 15.

The hand guards cover approximately 180° directly in front of the rider's hands. When the vehicle is in motion, natural air flow deflects rain and wind chill away from the uncovered portion of the rider's hands. This allows protection while giving maximum access to controls for safety and comfort.

The hand guards are constructed from high impact plastic and are fastened securely on each side of the rider's hands. Since the hands are extended to the outside extremes of the vehicle, the hand guards help protect the hands from many hazards likely to be encountered.

Although the invention has been described and illustrated with reference to a particular embodiment, it is to be appreciated and understood that various adaptations and modifications may be made without departing from the scope of the invention as set forth by the appended claims.

I claim:
1. A rigid plastic cover, referred to as a hand-guard, which is adapted to encircle the front 180° of the hand of the operator of a handlebar-controlled vehicle, mounted securely by fastening devices to a handlebar mounted lever clamp just inboard of the operator's hand, and to an expanding fastener that is plugged directly into the end of the handlebar just outboard of the operator's hand.

2. The hand-guard of claim 1 having a top edge that is shaped to deflect water and wind and to present a broad smooth surface area to the operator's hands.

3. The hand-guard of claim 1 having reinforcing ribs for increased strength directly over the fingers of the operator's hand.

4. The hand-guard of claim 1 having a perimeter that is contoured to allow clearance for mirrors, hydraulic cylinders and throttle cables connected to the vehicle.

5. The hand-guard of claim 1 having an inner portion closely conforming to the handlebar that reduces air flow to the operator's hands.

6. The hand-guard of claim 1 having a mounting bracket for the inboard attachment of the hand-guard to the lever clamp, designed to connect directly to any of the three standard configurations of lever clamps thus maintaining proper alignment with the lever clamp.

* * * * *